United States Patent
Lee et al.

(10) Patent No.: US 10,049,665 B2
(45) Date of Patent: Aug. 14, 2018

(54) VOICE RECOGNITION METHOD AND APPARATUS USING VIDEO RECOGNITION

(71) Applicant: Samsung Electronics Co., Ltd., Gyeonggi-do (KR)

(72) Inventors: Dongyeol Lee, Gyeonggi-do (KR); Sangbum Suh, Seoul (KR)

(73) Assignee: Samsung Electronics Co., Ltd (KR)

( * ) Notice: Subject to any disclaimer, the term of this patent is extended or adjusted under 35 U.S.C. 154(b) by 457 days.

(21) Appl. No.: 13/950,933

(22) Filed: Jul. 25, 2013

(65) Prior Publication Data

US 2014/0028826 A1 Jan. 30, 2014

(30) Foreign Application Priority Data

Jul. 26, 2012 (KR) .................. 10-2012-0081837

(51) Int. Cl.
*G10L 15/25* (2013.01)
*G10L 25/87* (2013.01)
*G10L 15/22* (2006.01)

(52) U.S. Cl.
CPC .............. *G10L 15/25* (2013.01); *G10L 25/87* (2013.01); *G10L 15/22* (2013.01)

(58) Field of Classification Search
CPC .......... G10L 15/22; G10L 15/25; G10L 25/87
USPC .......... 348/77, 156; 704/725, 243, 251, 270, 704/233; 379/88.01; 455/563; 382/118
See application file for complete search history.

(56) References Cited

U.S. PATENT DOCUMENTS

| | | | |
|---|---|---|---|
| 6,243,683 B1 | 6/2001 | Peters | |
| 6,343,269 B1 * | 1/2002 | Harada | G10L 15/24 704/243 |
| 6,594,629 B1 * | 7/2003 | Basu | G06K 9/00228 704/233 |
| 6,690,815 B2 | 2/2004 | Mihara et al. | |
| 8,922,485 B1 * | 12/2014 | Lloyd | G06F 3/0487 345/156 |
| 2001/0012996 A1 * | 8/2001 | Bartosik | G10L 25/87 704/233 |
| 2002/0035475 A1 | 3/2002 | Yoda | |
| 2003/0048930 A1 * | 3/2003 | Mihara | G06K 9/00201 382/118 |
| 2003/0144844 A1 | 7/2003 | Colmenarez et al. | |
| 2005/0075875 A1 * | 4/2005 | Shozakai | G06K 9/00335 704/231 |
| 2005/0165604 A1 | 7/2005 | Hanazawa | |
| 2009/0182562 A1 * | 7/2009 | Caire | G01C 21/3608 704/275 |

(Continued)

OTHER PUBLICATIONS

European Search Report dated Dec. 8, 2015 issued in counterpart application No. 13822547.9-1910, 6 pages.

*Primary Examiner* — Thai Tran
*Assistant Examiner* — Stephen Smith
(74) *Attorney, Agent, or Firm* — The Farrell Law Firm, P.C.

(57) ABSTRACT

Provided are a method and an apparatus for performing exact start and end recognition of voice based on video recognition. The method includes determining whether a speech starts based on at least one of first video and audio data before conversion into a voice recognition mode, converting into the voice recognition mode and generating second audio data including a voice command, when it is determined that speech starts, and determining whether the speech is terminated based on at least one of second video and audio data after conversion into the voice recognition mode.

14 Claims, 12 Drawing Sheets

(56) References Cited

U.S. PATENT DOCUMENTS

| | | | |
|---|---|---|---|
| 2009/0326944 A1 | 12/2009 | Yano et al. | |
| 2010/0009719 A1* | 1/2010 | Oh | H04M 1/72583 |
| | | | 455/563 |
| 2010/0204987 A1* | 8/2010 | Miyauchi | G10L 15/25 |
| | | | 704/233 |
| 2011/0071830 A1* | 3/2011 | Kim | G01C 21/3602 |
| | | | 704/246 |
| 2011/0257971 A1 | 10/2011 | Morrison | |
| 2012/0075184 A1* | 3/2012 | Madhvanath | G10L 15/22 |
| | | | 345/161 |
| 2012/0260171 A1* | 10/2012 | Young | H04N 21/4314 |
| | | | 715/719 |
| 2013/0021459 A1* | 1/2013 | Vasilieff | G10L 25/78 |
| | | | 348/77 |
| 2013/0190055 A1* | 7/2013 | Kulas | G06F 3/041 |
| | | | 455/566 |
| 2013/0307771 A1* | 11/2013 | Parker | G06F 3/013 |
| | | | 345/158 |
| 2015/0161992 A1* | 6/2015 | Jung | G10L 15/083 |
| | | | 704/251 |

* cited by examiner

FIG. 5
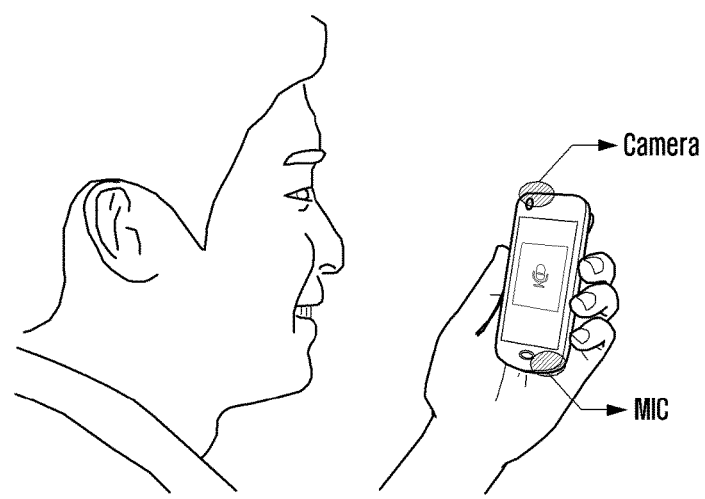
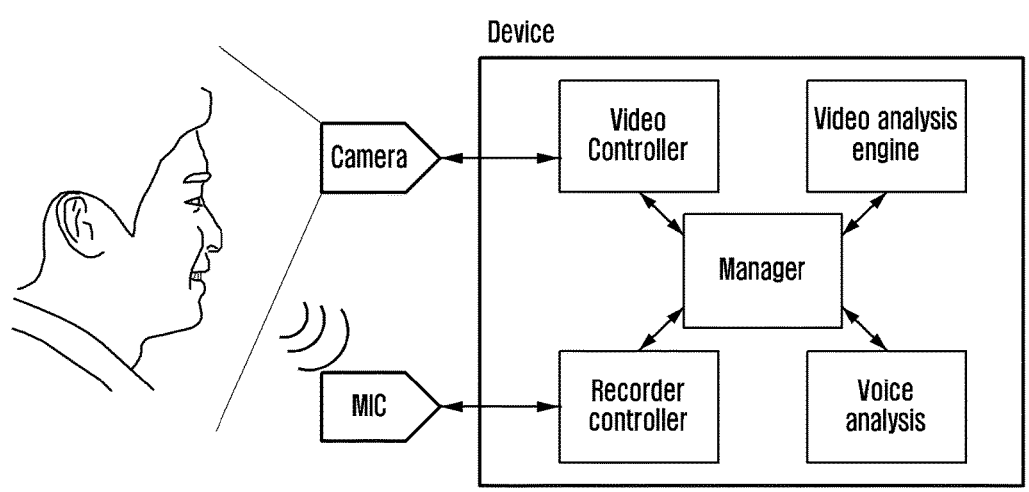

US 10,049,665 B2

VOICE RECOGNITION METHOD AND APPARATUS USING VIDEO RECOGNITION

PRIORITY

This application claims priority under 35 U.S.C. § 119(a) to a Korean patent application filed on Jul. 26, 2012 in the Korean Intellectual Property Office and assigned Serial No. 10-2012-0081837, the contents of which are incorporated herein by reference.

BACKGROUND OF THE INVENTION

1. Field of the Invention

The present invention relates generally to a voice recognizing method and apparatus by using video recognition in a terminal, and more particularly, to a method and apparatus for detecting a speech start time and a speech end time through video recognition by a camera without a separate user gesture, and increasing accuracy of voice recognition.

2. Description of the Related Art

Voice recognition technology, when substituted for physical input, aims to enable a user to conveniently use electronic devices without movement. For example, the voice recognition technology may be implemented in various electronic devices such as a smart phone, a television, and a vehicle navigation device.

FIG. 1 illustrates a display screen of a terminal for recognizing voice according to the related art. The voice recognition technology in FIG. 1 requires a user to record start, speak, record end, and perform result computation by operating a specific program. The related art shown in FIG. 1 is implemented by a pre-defined key word or a structure for general free voice recognition, rather than a technology of processing a command according to a current state of a device.

The voice recognition technology statistically analyzes and classifies input voice. It is important to minimize noise or silent section of recorded data for exact voice recognition. However, when considering various situations of a user recording voice, a noise other than a speaker's voice is likely to be included in voice recording data, and it is difficult to exactly recognize a voice speaking state.

The user needs a separate operation to start voice recording. For example, when the user is driving a vehicle or carries a burden may be considered. Voice recognition is a very valuable function in such instances, since a terminal function may be executed by using only a user's voice without separate key or gesture input. Accordingly, there is a need in the art for a voice recognition technology that does not require separate gesture user input from the start of voice recording.

SUMMARY OF THE INVENTION

The present invention has been made in view of the above problems, and provides a method capable of executing a voice recognition terminal function without a finger motion by the user, and an apparatus thereof.

The present invention further provides a method of recognizing a speech start time and a speech end time through video recognition and exactly and rapidly recognizing voice there-through, and an apparatus thereof.

In accordance with an aspect of the present invention, a method of recognizing a voice command by an electronic device includes determining whether a speech starts based on at least one of first video data and first audio data before conversion into a voice recognition mode, converting the electronic device into the voice recognition mode and generating second audio data including a voice command of a user, when it is determined that speech starts, and determining whether the speech is terminated based on at least one of second video data and second audio data after conversion into the voice recognition mode.

In accordance with another aspect of the present invention, an electronic device for recognizing a voice command includes an audio processor which collects and records a voice input, a camera unit which collects and records a video input, and a controller which controls to generate first video data or first audio data before conversion into a voice recognition mode, determine whether a speech starts based on at least one of the first video data and the first audio data, convert into the voice recognition mode when it is determined that the speech starts, control to generate second audio data or second video data including a voice command of a user, and determine whether the speech is terminated based on at least one of the second video data and the second audio data.

In accordance with another aspect of the present invention, a platform for recognizing a voice command includes a multi-media framework which collects and records voice input or video input to generate first video data or first audio data before conversion into a voice recognition mode, and generate second video data or second audio data after conversion into the voice recognition mode, and a voice framework which determines whether a speech starts based on at least one of the first video data or the first audio data, and determines whether the speech is terminated based on at least one of the second video data or the second audio data.

BRIEF DESCRIPTION OF THE DRAWINGS

The objects, features and advantages of the present invention will be more apparent from the following detailed description in conjunction with the accompanying drawings, in which:

FIG. 5 illustrates a configuration of an apparatus for recognizing voice according to an embodiment of the present invention;

DETAILED DESCRIPTION OF EMBODIMENTS OF THE INVENTION

Figure 1:
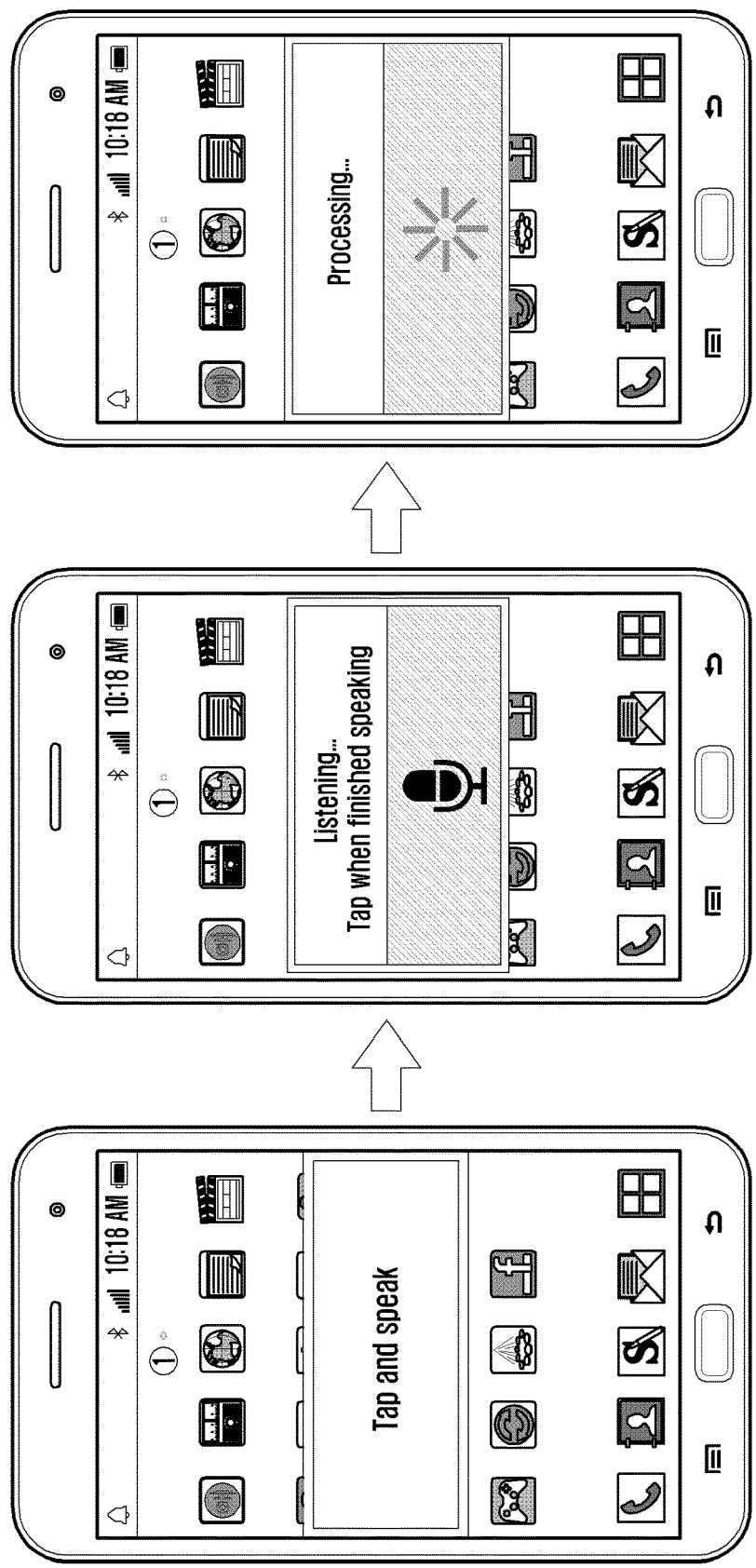
FIG. 1 illustrates a display screen of a terminal for recognizing voice according to the related art.

Embodiments of the present invention are described with reference to the accompanying drawings in detail. The same reference numerals are used throughout the drawings to refer to the same or like parts. Detailed descriptions of well-known functions and structures incorporated herein may be omitted to avoid obscuring the subject matter of the present invention.

The terminal 200 of the present invention includes all electronic devices supporting a voice recognition function.

For example, the terminal 200 includes a portable phone, a Portable Multimedia Player (PMP), a digital broadcasting player, a vehicle navigation device, a Personal Digital Assistant (PDA), a music player (e.g., MP3 player, a portable game terminal, a tablet Personal Computer (PC), and a smart phone. The terminal 200 includes various devices supporting a voice recognition function including home appliances such as a television, a refrigerator, and a washing machine installed at a fixed location.

Figure 2:
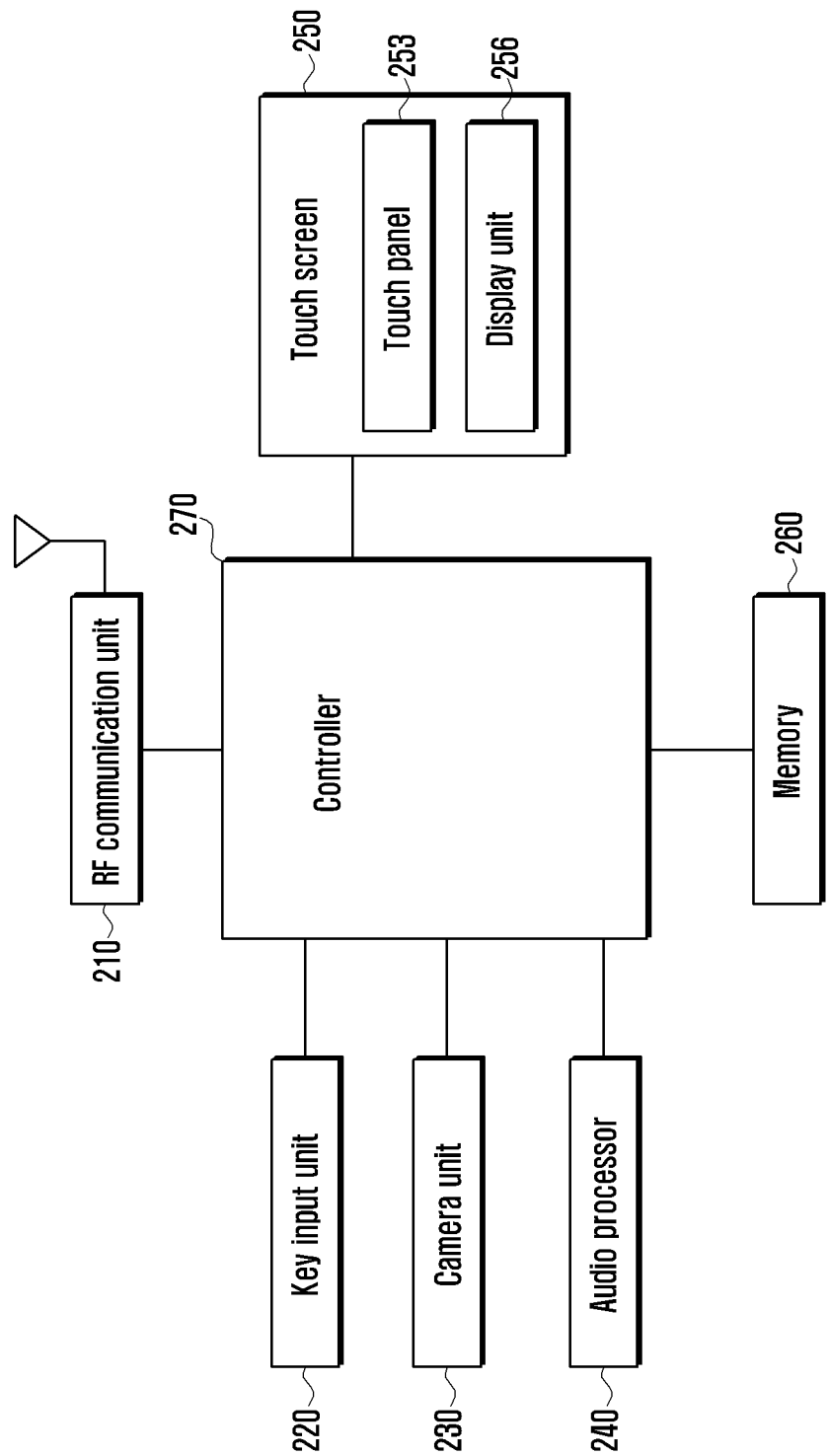
FIG. 2 illustrates a configuration of a terminal according to an embodiment of the present invention.

FIG. 2 illustrates a configuration of a terminal 200 according to an embodiment of the present invention.

Referring to FIG. 2, the terminal 200 of the present invention includes a Radio Frequency (RF) communication unit 210, a key input unit 220, a camera unit 230, an audio processor 240, a touch screen 250, a memory 260, and a controller 270.

The RF communication unit 210 forms a communication channel for each of voice call, video call, and transmitting data such as a video or a message under control of the controller 270 (hereinafter, data communication channel).

The key input unit 220 includes a plurality of input keys and function keys for receiving numeric or character information, and setting various functions. The function keys include arrow keys, side keys, and hot keys set for executing a specific function. The key input unit 220 generates a key signal associated with user setting and function control of the terminal 200, and sends the generated key signal to the controller 270. When the touch screen 250 of the terminal 200 is supported in the form of a full touch screen, the key input unit 220 includes side keys, home keys, and other function keys that are provided at a side of a case of the terminal 100.

Particularly, the key input unit 220 of the present invention includes a voice recognition function key set for executing a voice recognition function. The key input unit 220 sends a voice recognition function key event generated from the voice recognition function key to the controller 270, which determines start and end of a voice recognition mode according to a request signal of the voice recognition function key.

The camera unit 230 provides collected video by shooting a subject, and may be activated according to a signal generated from the touch screen 250 or the key input unit 220 to collect the videos. The camera unit 230 includes a camera sensor which converts an optical signal into an electric signal, an image signal processor which converts an analog video signal into a digital video signal, and a Digital Signal Processor (DSP) which processes a video signal (scaling, noise removal, Red, Green, Blue (RGB) signal conversion) output from the image signal processor in order to display the video signal on the touch screen 250. The camera sensor includes a Charge-coupled Device (CCD) sensor or a Complementary Metal-Oxide Semiconductor (CMOS) sensor. The DSP configuration may be omitted and may be implemented by a DSP chip.

The camera unit 230 drives a camera in an idle mode of the terminal 200 to record a user image under control of the controller 270, sends the recoded video to the controller 270 to provide image recognition data capable of recognizing a user's face, and may be activated in the idle mode of the terminal 200 according to user setting, or according to separate user input.

The audio processor 240 includes a speaker (SPK) for playing transceived audio data during a call, audio data included in a received message, and audio data according to playback of an audio file stored in the memory 260, and a microphone (MIC) for collecting a user's voice or other audio signals during the call.

Particularly, the audio processor 240 drives the MIC in a voice recognition mode to record the user's voice collected through the MIC under control of the controller 270. The audio processor 240 sends the recorded voice to the controller 270 so that the recognition for the recorded voice may be performed. If the voice recognition mode starts or is terminated, the audio processor 240 may or may not output a corresponding effect sound, depending on a user setting.

The touch screen 250 includes a touch panel 253 and a display unit 256, and the touch panel 253 may be disposed at a front surface of the display unit 256. The size of the touch screen 250 may be determined by the size of the touch panel 253. The touch screen 250 may display a screen according to execution of a user function and detect a touch event related with control of the user function.

The touch panel 253 is disposed in at least one of upper and lower portions of the display unit 256, and a sensor constituting the touch panel 253 is arranged in a matrix pattern. Accordingly, the touch panel 253 may generate a touch event according to a contact or approach distance of a touched object on the touch panel 253, and send the generated touch event to the controller 270. The touch event includes a touched type and location information.

The display unit 256 displays information input by the user or information provided to the user as well as various menus. That is, the display unit 256 may provide en execution screen of various user function according to use of the terminal 200. The display unit 256 may be configured as a Liquid Crystal Display (LCD) or an Organic Light Emitted Diode (OLED). The display unit 256 may be disposed at an upper or lower portion of the touch panel 253.

When the controller 270 determines that a current state of a user is speech start, the display unit 256 displays a voice command in the pop-up form under control of the controller 270. When the controller 270 succeeds in the voice recognition, the display unit 256 displays the recognized voice command in the popup form.

The memory 260 stores at least one application necessary for a function operation, user data generated by the user, a message transceived with a network, and data according to execution of the application. The memory 160 includes, for example, a program area and a data area (not shown). The program area stores an Operating System (OS) for booting the terminal 200 and for operating the foregoing constituent elements, and downloaded and installed applications. Particularly, the program area of the present invention further stores a video recognition-operating program and a voice recognition operation program.

The video recognition-operating program analyzes collected video data to determine a speech start time point and a speech end time point of the user. The video recognition-operating program is driven in an idle state of the terminal 200, and according to separate user input.

The voice recognition-operating program supports the terminal 200 such that a function of the terminal 200 is executed using voice recognition. In particular, the voice recognition-operating program according to the present invention is used to determine the speech start time point and the speech end time point of the user in cooperation with the video recognition-operating program. The voice recognition-operating program includes a routine of executing a corresponding function based on the voice recognition result when it is determined that one of preset voice commands is input.

The data area stores data generated according to use of the terminal 200.

The data area stores data to be used or generated during execution of the data video recognition-operating program and the voice recognition-operating program. In addition, the data area may store various statistic models and a voice recognition result for voice recognition in connection with the voice recognition-operating program.

The controller 270 controls an overall operation of the terminal 200. Particularly, the controller 270 of the present invention determines the speech start time point and the speech end time point, determines a voice command input by the user, and controls a series of procedures for executing a function of the terminal 200 connected to the voice command.

Figure 3:
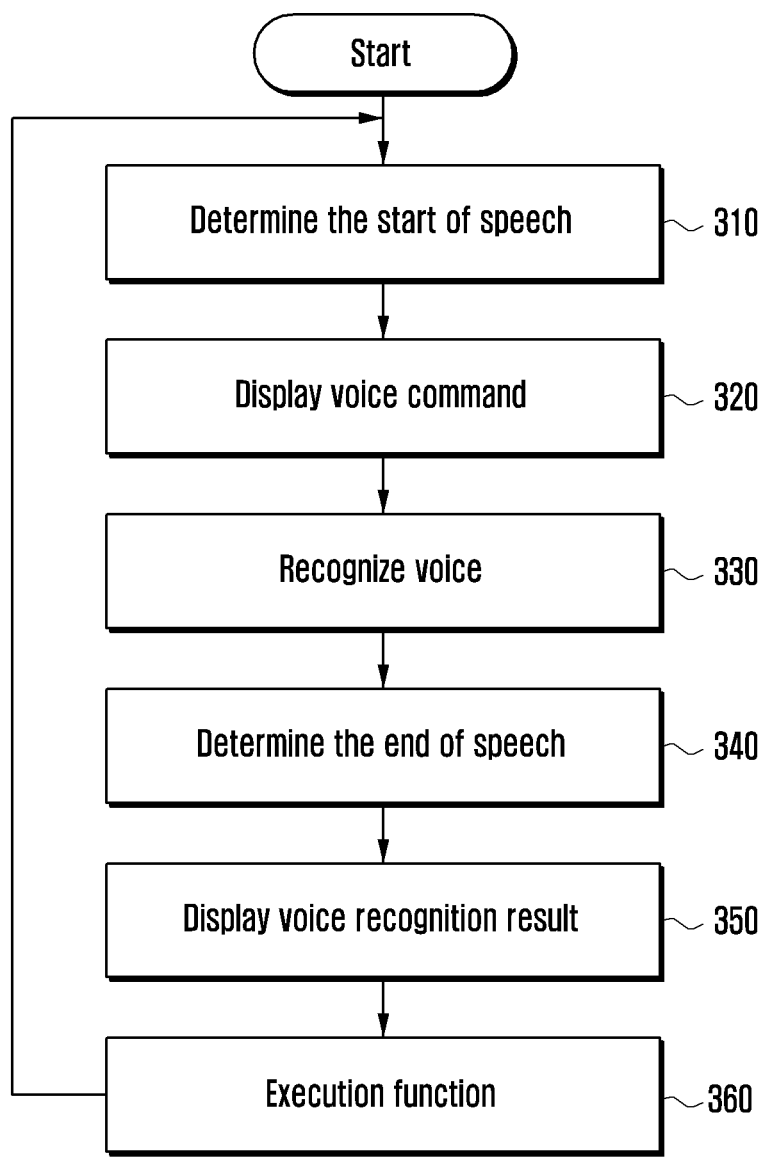
FIG. 3 illustrates a method of recognizing voice according to an embodiment of the present invention.

FIG. 3 illustrates a method of recognizing voice according to an embodiment of the present invention.

The method of FIG. 3 starts from an idle mode of a terminal in which only the camera unit 230 is activated. The method of recognizing voice according to the embodiment of the present invention may also start from an active mode of the terminal. In this instance, the display unit 256 displays a user-function execution screen that is configured with widgets including at least one image, such as an icon, a thumbnail or a character. Each of the image constituent elements is associated with a specific function. Accordingly, if a voice command is recognized, the controller 270 may control such that a function associated with the specific image constituent element is executed.

Steps 310 and 320 are for determining the start of speech to determine whether to convert to a voice recognition mode.

A camera unit 230 collects video data, and an audio processor 240 collects audio data through recording (310). The controller 270 simultaneously analyzes the video data and the audio data to determine the start of speech. The video data may be collected by driving only the camera unit 230, without driving the audio processor 240. When it is determined that a mouth shape of a user recorded in the video data is open, the controller 270 determines that the open mouth shape of the user is the speech start for starting a voice recognition function.

In detail, a method of checking a speech start time point according to the embodiment of the present invention includes a first method of determining only recorded video data. That is, the first method analyzes a recorded video to find a mouth shape of the user, and analyzes the mouth shape of the user to find a speech time point by the user.

A second method is simultaneously analyzing a recorded video and a recorded voice to find a speech time point.

According to the second method, instances when a human user does not speak and just moves his/her mouth or when a sound is barely audible may be considered. The second method is advantageous in that it recognizes a mouth shape and magnitude of the recorded voice and determines whether the sound is a human voice to exactly recognize the speech time point.

In the second method, when it is determined that both of results of analyzing the recorded video and the recorded voice are speech start, the controller 270 determines that the speech starts.

However, when only the result of analyzing the video is determined to be the speech end, the controller 270 attenuates a voice recording data determination threshold and re-determines speech end. When it is determined that the result of re-determination the voice is valid, the controller 270 determines this situation as the speech end. When it is determined that the result of re-determination the voice is invalid, the controller 270 does not determine this situation as the speech end.

When it is determined that only the result of analyzing the voice is the speech start, for example, when a user's face does not appear in video recognition, the controller 270 determines that a current state of the user is not the speech start. However, if the face is recognized, the controller 270 attenuates a determination threshold of motion of the mouth shape and re-determines. When the result of the re-determination is valid, the controller 270 determines that the current state of the user is the speech start. When the result of the re-determination is invalid, the controller 270 determines that the current state of the user is not the speech start.

When the controller 270 determines that the user starts speech for voice recognition, the controller 270 controls the display unit 256 to display a voice command connected to currently displayed widgets in step 320. When the audio processor 240 is not driven in step 310, the controller 270 drives the audio processor 240 to convert a mode to a voice recognition mode in step 330.

According to the present invention, when the terminal 200 converts the mode to a voice recognition mode, the controller 170 may display voice commands associated with a current execution screen on the display unit 256, since the user may view a command to be executed on a screen when the command is a voice command for controlling a device instead of a general dictation function. For example, in order to execute a function touching an icon of a screen through voice, the controller 170 displays an executable command to the user and the user may speak a command to be executed.

For example, when the user opens his mouth, the controller 270 determines that the speech starts in step 310, a voice command is displayed on a popup window, and recording begins through a recorder in step 320. However, if the user shuts his mouth before conversion to the voice recognition mode, the command is not displayed and recording by the recorder ends.

In the foregoing example, the controller 270 determines whether a voice included in data recorded by the recorder is valid. When the voice is valid, voice recognition for the recorded data starts. If speech terminal is checked in steps 340 and 350 of checking a speech end time point, the recording is stopped, and a silent section of actually recorded data is analyzed to integrally determine a voice recognition result.

The controller 270 may control the display unit 256 to display a voice command of 'calendar' within a set distance in a zone in which a specific icon, such as a calendar icon, is displayed in the home screen in step 320. The controller 270 may output a voice command of 'Help' to any part of a blank of an execution screen. This function is for minimizing an amount of processing data for voice recognition and provides rapid and exact voice recognition service by limiting a voice recognition function to specific voice commands.

Particularly, when determining a display location of a voice command, if there is an image constituent element associated with a function connected to the voice command, the controller 270 selects a display location of the voice command as a periphery of the image constituent element, and determines whether the image constituent element exists with reference to a map of an execution screen. In addition, the controller 270 selects the display location of the voice command with reference to the map of the execution screen.

For example, the controller 270 may display the voice command at a location in which an icon connected to a video play function is displayed, in a video execution screen. That is, the controller 270 may display a pause voice command around a pause icon.

In addition, the controller 270 may output the voice command in a preset display scheme. For example, the controller 270 may display the voice command to overlay an execution screen in the form of tool-tip or speech balloon. When there is a plurality of voice commands such that a plurality of functions is connected with one image constituent element, the controller 270 may display voice command in list form. The controller 270 may control the display unit 256 to display integral voice commands on one pop-up window or a separate screen. A detailed user interface displaying the voice commands will be described with reference to FIG. 8.

The controller 270 recognizes a voice through the audio processor 240 in step 330.

A user's face may be deviated from a video recording area during the voice recognition. When the user is deviated from the video recording area during recording, the controller 270 may check a speech end section by only voice analysis, and report this instance to the user through the display unit 256 or a speaker of the audio processor 240.

The user may be deviated from a recording area before speech start. Since it may be assumed that the user does not use the device, the controller 270 does not start voice recognition until the user's face enters the recording area. The controller 270 may report this instance to the user through the display unit 256 or a speaker of the audio processor 240.

Typically, the controller 170 classifies phonemes from recorded voice data and recognizes a word (or word sequence) configured by the phonemes. Particularly, the controller 270 may perform voice recognition based on voice commands previously displayed on an execution screen according to step 320.

For example, the controller 270 may recognize the voice for each phoneme or word, and compare the recognized voice with phonemes or words of the voice commands displayed on the display unit 256 to shorten a voice recognition time/ In this case, the terminal 100 performs the voice recognition instead of the voice recognition being consigned to an external server.

However, the present invention is not limited thereto, and may be implemented according to the related art supporting intelligent voice recognition. For example, when receiving a voice command to check a current day schedule from the user, the controller 270 may analyze a natural language of the user to determine a corresponding command in step 330.

If it is determined that audio data including the voice command is deviated from noise, error, or recognition range, the controller 270 reports voice recognition end to the user, and may return to step 310. This includes a case of previously displaying the voice command on the execution screen.

In steps 340 and 350, the controller 270 checks the end of speech to determine whether to terminate the voice recognition mode.

The camera unit 230 may collect video data, and the audio processor 240 may collect audio data through recording to determine the end of speech in step 340. The controller 270 determines the end of speech by simultaneously analyzing the video data and the audio data. Alternatively, the audio processor 240 may only be driven to collect audio data without driving the camera unit 230. When the user's voice is not input for at least a preset time in the audio data, the controller 270 determines a current state of the user as speech end for terminating the voice recognition function.

A method of checking a speech end time point according to the embodiment of the present invention may be depend on the method of checking the speech end time point using both of the recorded video and the recorded voice. When both of the results of analyzing the recorded video and the recorded voice are the speech end, the controller 270 determines this situation as the speech end. However, when only the result of analyzing the video is determined to be the speech end, the controller 270 attenuates a voice recording data determination threshold and re-determines speech end. When it is determined that the result of the re-determination of the voice is valid, the controller 270 determines this situation as the speech end. When it is determined that the result of the re-determination of the voice is invalid, the controller 270 does not determine this situation as the speech end.

When only the result of analyzing the voice is determined to be the speech end, for example, when a user's face does not appear in video recognition, the controller 270 determines this situation as the speech end. However, if the face is recognized, the controller 270 attenuates a determination threshold of motion of the mouth shape and re-determines. When it is determined that the result of analyzing the voice is valid, the controller 270 determines that speech is terminated. When it is determined that the result of analyzing the voice is not valid, the controller 270 determines that the speech is not terminated.

When the controller 270 determines that the user terminates speech for voice recognition in step 340, the controller 270 controls the display unit 256 to display a voice recognition result in step 350.

For example, when receiving a voice command to search a neighboring famous restaurant in step 330, the controller 270 may display a voice recognition result, such as <searching a neighboring famous restaurant>, through the display unit 256. Thereafter, the controller 270 executes a function for a recognized voice command and terminates the voice recognition function in step 360. The controller 270 may return to step 310 and perform another voice recognition procedure.

In order to improve speed and memory, after determining the speech start in step 320, the controller 270 may analyze the end of the speech by only the voice without performing analysis through the video. When returning to step 310 after step 360, analysis by the video can begin.

Figure 4:
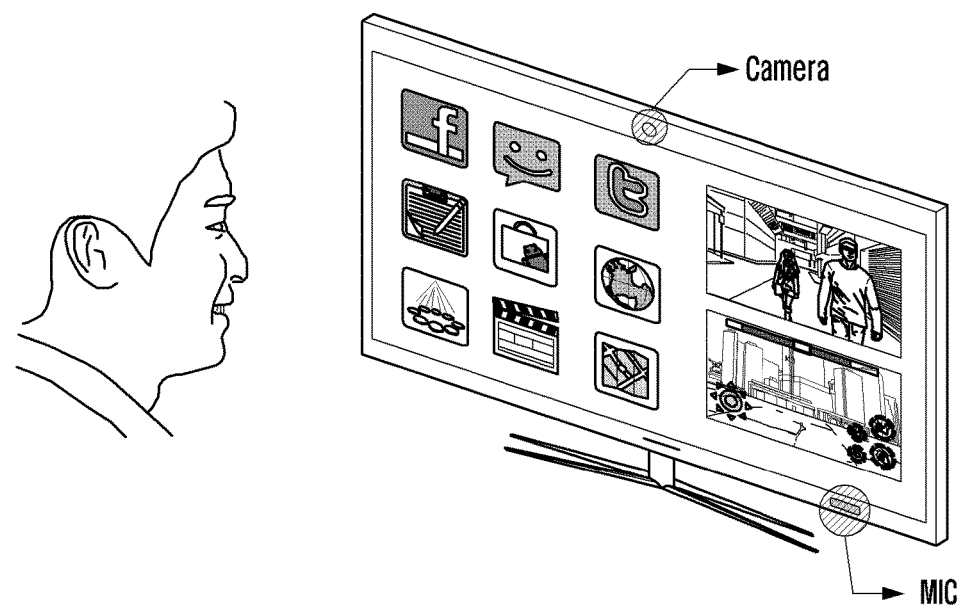
FIG. 4 illustrates an example of using voice recognition through a TV according to an embodiment of the present invention.

FIG. 4 illustrates an example of using voice recognition through a TV according to an embodiment of the present invention.

When a device is controlled through a voice, it is difficult to set a range of voice recognition. However, in the present invention, the user may set the terminal to recognize one ACTION at a time, and easily and continuously apply a voice command.

For example, as shown in FIG. 4, when using a smart TV, the user may command using a voice instead of button input of a general remote controller to execute a specific function of the smart TV. The user may fetch an application operating in a background to a foreground or easily adjust a setting menu option.

FIG. 5 illustrates a configuration of an apparatus for recognizing voice according to an embodiment of the present invention. As shown in FIG. 5, a portable terminal including a camera and a microphone may implement a voice recognition function using video recognition. As shown in FIG. 5, the apparatus for recognizing a voice includes the camera unit 230 and a microphone included in the audio processor 240. The controller 270 includes a constituent element for processing and analyzing a video recorded by a camera and a voice recorded by the microphone.

Figure 6:
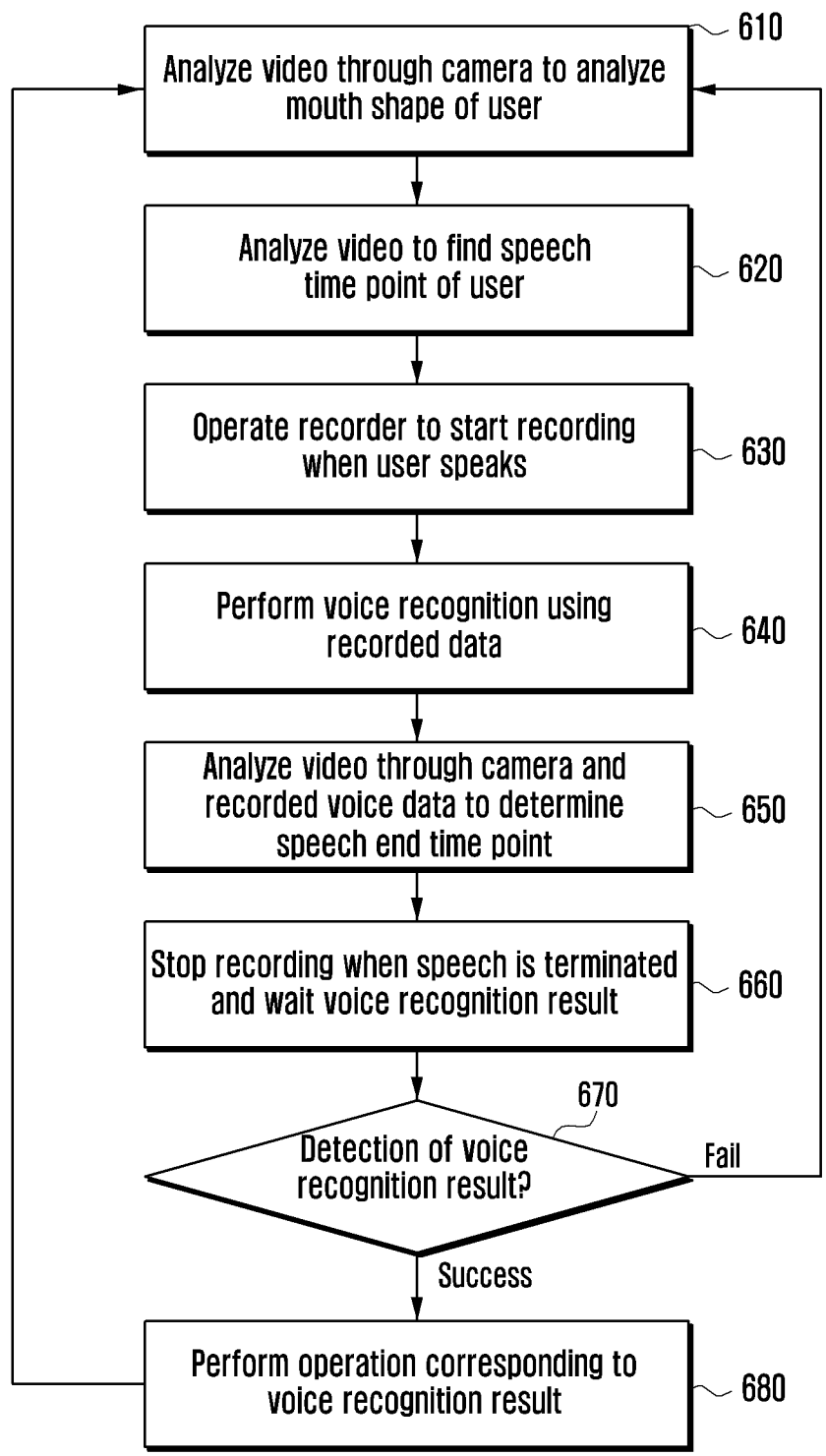
FIG. 6 illustrates a detail method of using voice recognition using a speech video according to an embodiment of the present invention.

FIG. 6 illustrates a detail method of using voice recognition using a speech video according to an embodiment of the present invention. Since the implementation method of the present invention was described in reference to FIG. 3, FIG. 6 will illustrate a representative embodiment of the present invention.

The controller 270 analyzes a video from the camera 230 in step 610 and, in detail, analyzes a mouth shape of a user to find a speech time point in step 620. If it is determined that the user speaks, the controller 270 operates a recorder 240 to start recording in step 630, and performs voice recognition using recorded data in step 640.

The controller 270 may analyze a video from a camera and recorded voice data to determine a speech end time point in step 650. If it is determined that speech is terminated, the controller 270 stops the recording and performs voice recognition in step 660.

When the controller 270 succeeds in the detection of the voice recognition result in step 670, the controller 270 performs an operation corresponding to the voice recognition result in step 680. If the detection of the voice recognition result is unsuccessful, or succeeds in the detection of the voice recognition result and a corresponding operation is completed, the controller 270 returns to the first step of analyzing the voice and places the speech start of the user on standby.

Figure 7:
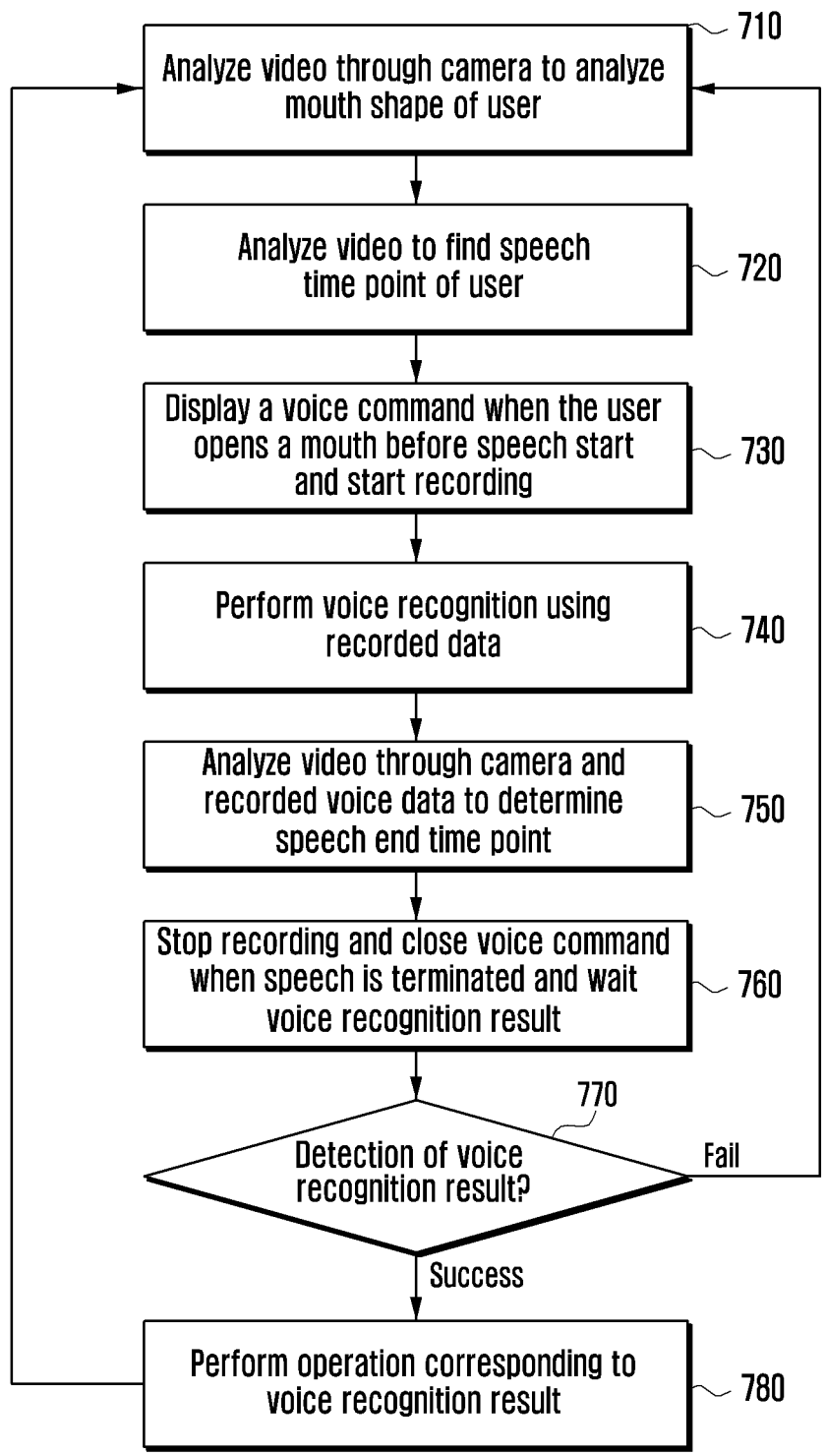
FIG. 7 illustrates a detail method of using voice according to an embodiment of the present invention when the terminal is controlled according to a voice command.

FIG. 7 illustrates a detailed method of using voice according to an embodiment of the present invention when the terminal is controlled through a voice command. Since the implementation method of the present invention was described in reference to FIG. 3, FIG. 7 will illustrate a representative embodiment of the present invention.

The controller 270 analyzes a video from the camera 230 in step 710 and, in detail, analyzes a mouth shape of a user to find a speech time point in step 720. When it is determined that the user opens a mouth before speech start, the controller 270 may display a voice command on a display unit 256. Concurrently, the controller 270 operates a recorder 240 to start recording in step 730, and performs voice recognition using recorded data in step 740.

The controller 270 may analyze recorded voice data and video data from camera to determine a speech end time point in step 750. If it is determined that speech is terminated, the controller 270 stops recording and terminates display of the voice command by the display unit 256, and performs voice recognition in step 760.

When the controller 270 succeeds in the detection of the voice recognition result in step 770, the controller 270 performs an operation corresponding to the voice recognition result in step 780. When the detection of the voice recognition result is unsuccessful, or succeeds in the detection of the voice recognition result and a corresponding operation is completed, the controller 270 returns to the first step of analyzing the voice and places speech start of the user on standby.

Figure 8:
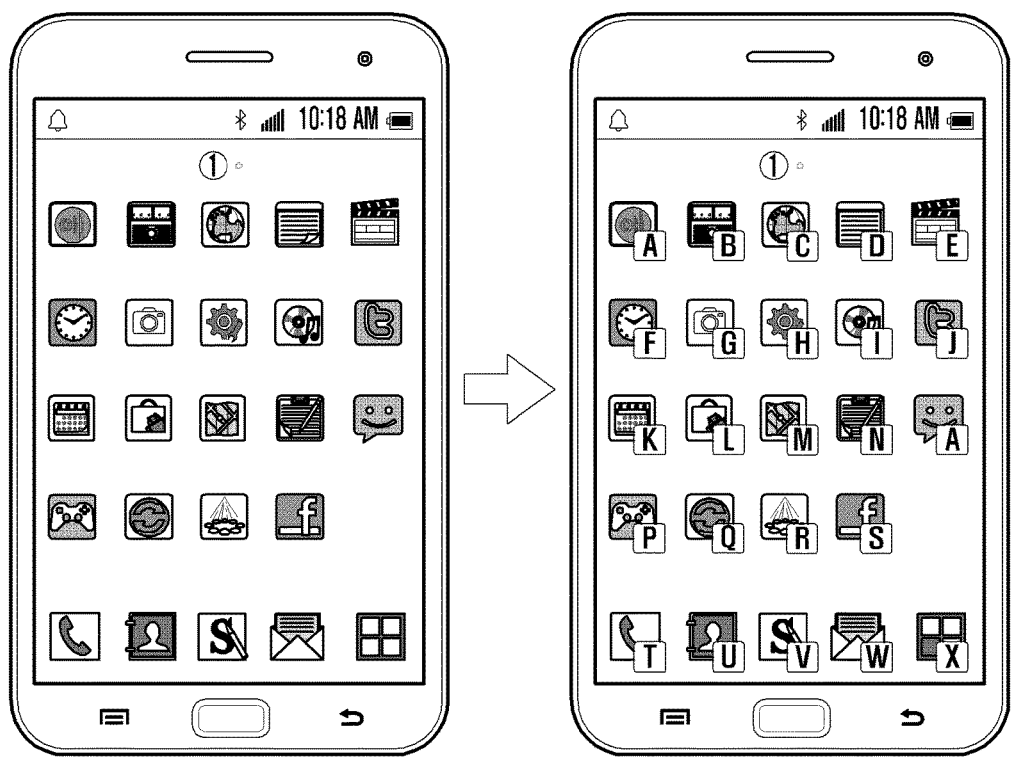
FIG. 8 illustrates an example of a concrete graphic interface displaying the voice command during the process of voice recognition according to an embodiment of the present invention.

FIG. 8 illustrates an example of a concrete graphic interface displaying the voice command during the process of voice recognition according to an embodiment of the present invention.

As shown in FIG. 8, voice recognition may be performed when a general screen displaying an icon for various applications is displayed. When the controller 270 determines the state of a user as speech start, the controller 270, as shown in FIG. 8, may display a voice command for executing an application on the display unit 256 together with an icon.

Figure 9:
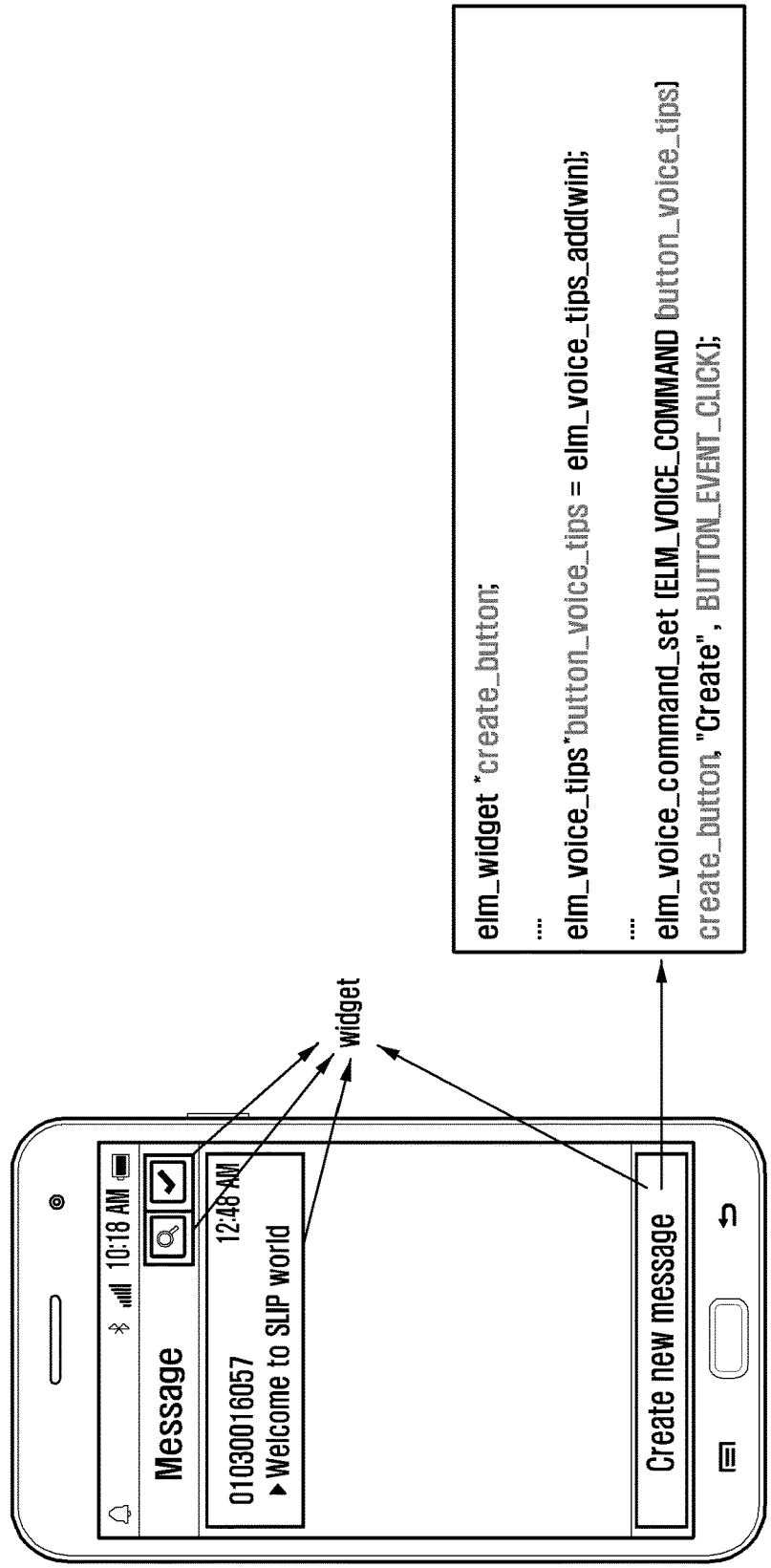
FIG. 9 illustrates an example of a widget for the voice command of an application and a source code capable of registering the voice command in the widget.

FIG. 9 illustrates an example of a widget for the voice command of an application and a source code capable of registering the voice command in the widget.

As shown in FIG. 9, a plurality of widgets displayed on the display unit 256 is respectively connected to an application. A voice such as <CREATE> may be registered as a voice command for executing an application connected to a <CREATE NEW MESSAGE> widget.

Figure 10:
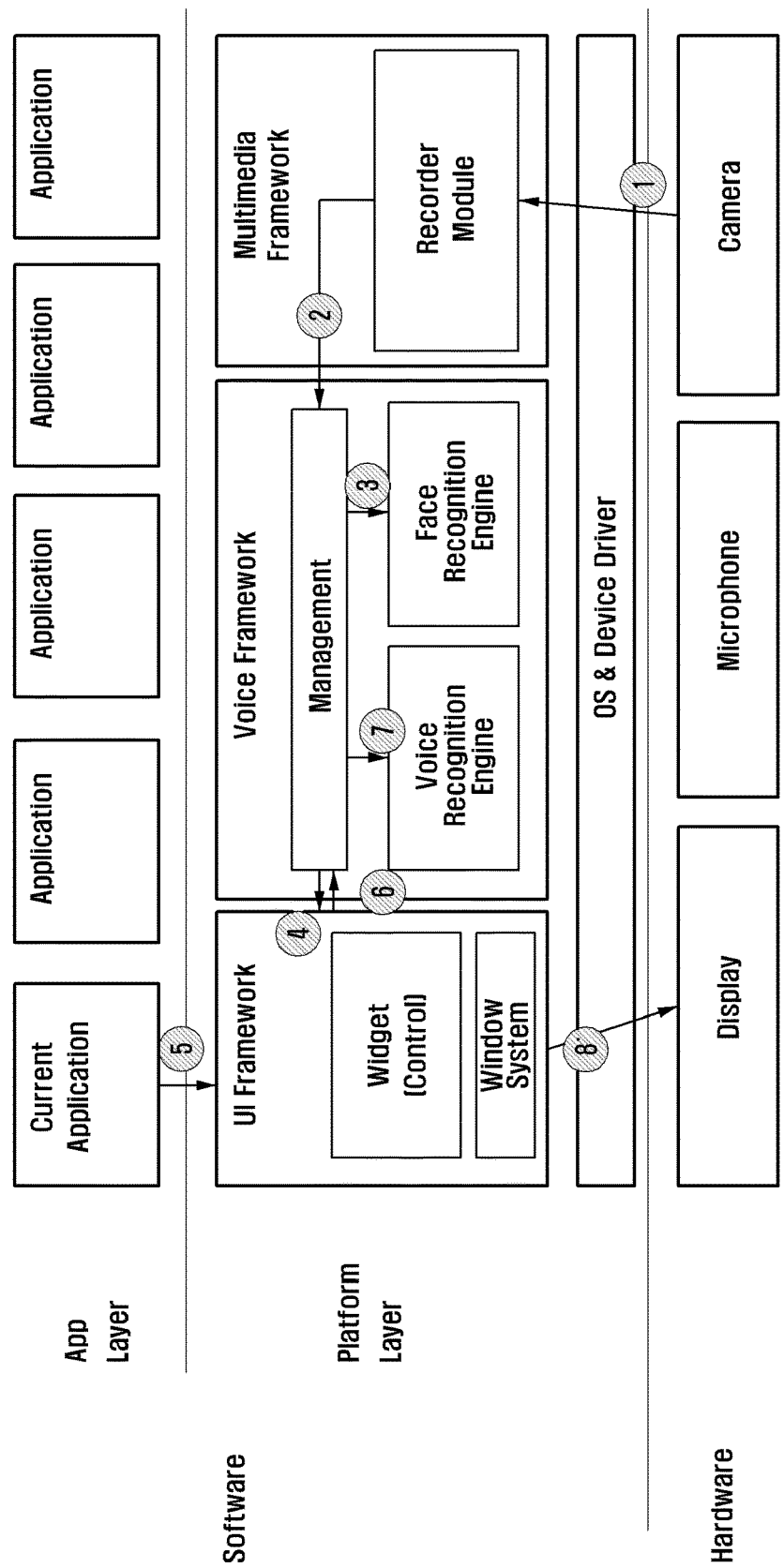
FIG. 10 illustrates a sequence configuring a screen displaying the voice command by determining a mouth shape of a user.

FIG. 10 illustrates a sequence configuring a screen displaying the voice command by determining a mouth shape of a user.

A record module starts recording through a camera 230 at numeral 1. At numerals 2 and 3, the camera unit 230 sends a recorded video to a face recognition engine, and the face recognition engine analyzes the video. At numeral 4, if the face recognition engine determines that the mouth shape of the user is open, the face recognition engine requests a voice command configuration to a user interface framework.

At numeral 5, the user interface framework may collect and configure commands of widgets of an application. Then, the user interface framework sends a command collected from numeral 6 to a voice framework and uses the command as a candidate group of voice recognition.

At numeral 7, the voice framework sends corresponding contents to a voice recognition engine to prepare the start of the voice recognition. At numeral 8, if the voice framework checks that a configured command having no problem, the user interface framework displays the configured command through a display unit so that the user can have recognition performed.

Figure 11:
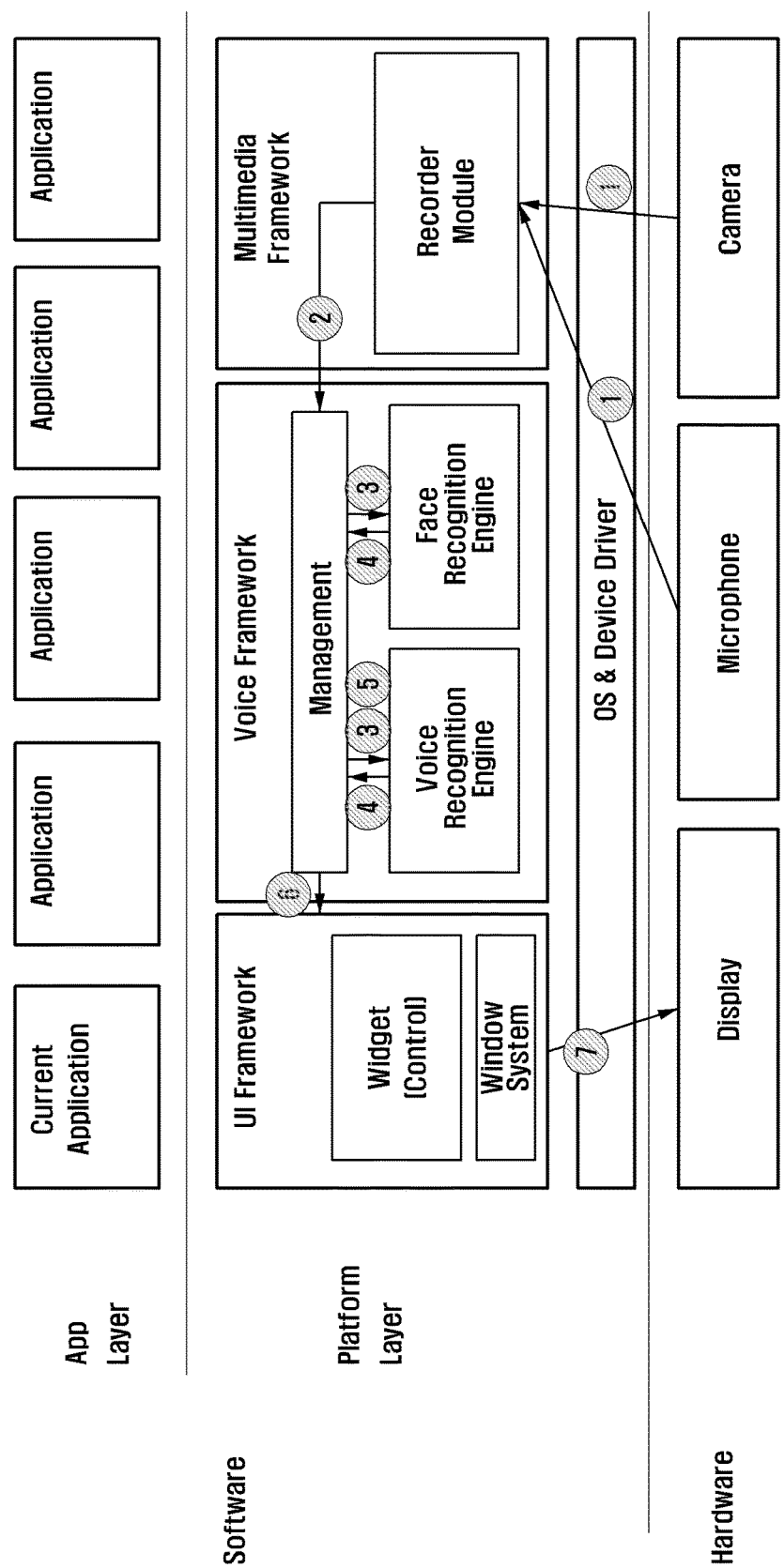
FIG. 11 illustrates an operation of a platform which checks a speech time point of the user.

FIG. 11 illustrates an operation of a platform that checks a speech time point of the user.

A record module starts recording of video and voice through a camera or a microphone at numeral 1. However, when a speech time point is determined by only a recording video, a recording function is not driven.

At numeral 2, the recorder module sends recording data of video and voice to a voice framework, and, at numeral 3, the recording data of video is sent to a face recognition engine and the recording data of voice is sent to a voice recognition engine so that the start of speech is determined. That is, at numeral 4, the controller 270 determines the start of speech based on the determination of each engine.

When it is determined that the speech starts, at numeral 5, the controller 270 reports voice recognition start to a voice recognition engine and continuously sends recorded data to the voice recognition engine. Concurrently, at numeral 6, the controller 270 may request the user interface framework to remove a command displayed on a current screen, and at numeral 7, the user interface framework removes a command displayed on a screen.

Figure 12:
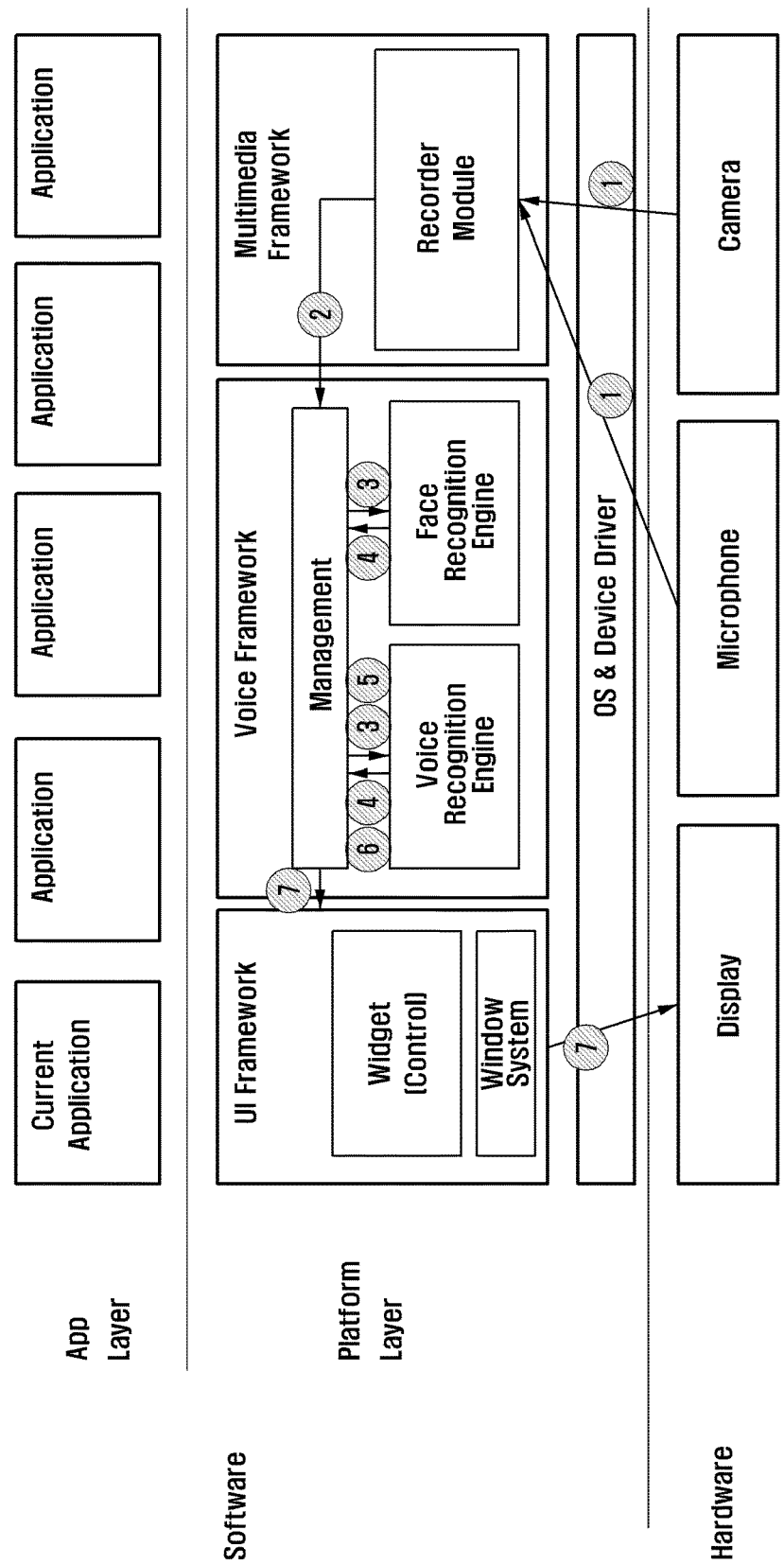
FIG. 12 illustrates an operation of a platform which checks a speech end time point of the user.

FIG. 12 illustrates an operation of a platform which checks a speech end time point of the user.

In numeral 1, a speech end checking time point is when a recorder module performs recording of video and voice through the camera and the microphone. However, when a speech end time point is determined by only recorded voice data, a recording function through the camera may not be driven.

At numeral 2, the recorded data of video and voice are sent to the voice framework, and, at numeral 3, the recorded data of video and voice are sent to the face recognition engine and the voice recognition engine so that the recorded data is used to determine the end of speech.

At numeral 4, the controller 270 determines the end of speech based on determination of each engine. If it is determined that the speech ends at numeral 5, the controller 270 controls the voice recognition engine to stop the recording of voice, and determines a final voice recognition result from the recorded data of voice. That is, at numeral 6, the controller 270 receives the final recognition result through the voice recognition engine.

At numeral 7, the controller 270 detects ACTION corresponding to the final voice recognition result to request execution of the ACTION to a corresponding module.

The present invention may be implemented when there is more than one user. For example, the present invention includes a display module such as a camera module, a recorder module, a projector and a monitor, and a video conferencing system having a voice recognition module and a video recognition module.

The video conferencing system enables a plurality of users to remotely participate in a video conference and simultaneously displays faces of a plurality of users on a monitor. When at least one or more speakers exist among a plurality of users during the video conference, speech start and end time points of a plurality of participators in the video conference may be clearly determined.

For example, if user A opens his mouth while users A, B, C, and D progress a video conference, the present invention determines that the user A starts to speak. The present invention may simultaneously analyze a recorded video and a recorded voice to determine that speech of the user A is terminated and speech of the user B starts.

When considering the specialty of the video conference, according to another embodiment of the present invention, if the user C lifts his hand, the recorded video is analyzed to determine that speech of the user C starts. If the user C lowers his hand, it may be determined that the speech of the user C is terminated.

Based on such a determination, in the video conferencing system, a video conference user interface may be designed in such a manner that the face of the speaker is fully displayed on a monitor. Further, only the speaker may use the voice recognition function for controlling the video conferencing system.

The user can drive the voice recognition function without using hands, and can continuously perform voice recognition.

A speech time point of the user can be exactly detected to minimize an amount of analyzed recording data of voice so that accuracy and speed of the voice recognition can be improved.

It is clear that the present invention can be realized by hardware, software (i.e., a program), or a combination thereof. This program can be stored in a volatile or non-volatile recording medium readable by a machine such as a computer. This medium can be a storage device such as a Read-Only Memory (ROM), a memory such as a Random-Access Memory (RAM), a memory chip, or an integrated circuit, or an optical or magnetic recording medium such as a Compact Disk (CD), a Digital Versatile Disk (DVD), a magnetic disk, or a magnetic tape.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of recognizing a voice command by an electronic device, the method comprising:
    analyzing first video data and first audio data to determine a start of speech, the first video data being a mouth shape;
    when it is determined that results of both analyzing the first video data and analyzing the first audio data indicate the speech starts, converting a mode to a voice recognition mode;
    when it is determined that the result of analyzing the first audio data indicates that the speech starts,
    attenuating a threshold of video data for determining whether the speech starts and re-determining whether the speech starts;
    when it is determined that the result of analyzing the first video data indicates that the speech starts, attenuating a threshold of audio data for determining whether the speech starts and re-determining whether the speech starts;
    simultaneously displaying at least one user-selectable icon operatively connected to an executable function of the electronic device and a voice command corresponding to each of the at least one user-selectable icon in the voice recognition mode; and
    determining whether the speech is terminated based on second video data and second audio data.

2. The method of claim 1, further comprising removing display of the voice command after determining whether the speech is terminated.

3. The method of claim 2, wherein determining whether the speech starts comprises identifying a lip of the user from the first video data and determining whether the speech starts based on whether the lip is in an open position.

4. The method of claim 1, wherein determining whether the speech is terminated comprises determining that the speech is terminated when a voice of the user is not included in the second audio data for at least a preset time.

5. The method of claim 1, wherein determining whether the speech is terminated comprises determining that the speech is terminated when a face of the user is not included in the second video data.

6. An electronic device which recognizes a voice command, the electronic device comprising:
    an audio processor which collects and records a voice input;
    a camera unit which collects and records a video input;
    a display unit which displays a screen; and
    a controller which:
    analyzes first video data and first audio data to determine the start of speech, the first video data being a mouth shape;

when it is determined that results of both analyzing the first video data and analyzing the first audio data indicate that the speech starts, converts a mode to a voice recognition mode;

when it is determined that the result of analyzing the first audio data indicates that the speech starts, attenuates a threshold of video analysis for determining whether the speech starts and re-determines whether the speech starts;

when it is determined that the result of analyzing the first video data indicates that the speech starts, attenuates a threshold of audio analysis for determining whether the speech starts and re-determines whether the speech starts;

when it is determined that the speech starts, controls the display unit to simultaneously display at least one user-selectable icon operatively connected to an executable function of the electronic device and a voice command corresponding to each of the at least one user-selectable icon; and determines whether the speech is terminated based on second video data and second audio data.

7. The electronic device of claim 6, wherein the controller controls the display unit to remove display of the voice command when the speech is terminated.

8. The electronic device of claim 7, wherein the controller identifies a lip of a user from the first video data, and determines whether the speech starts based on whether the lip is in an open position.

9. The electronic device of claim 6, wherein the controller determines that the speech is terminated when a voice of the user is not included in the second audio data for at least a preset time.

10. The electronic device of claim 6, wherein the controller determines that the speech is terminated when a face of the user is not included in the second video data.

11. A non-transitory processor-readable medium for storing a platform for recognizing a voice command, the platform comprising:
a user interface framework which displays a screen, wherein the user interface framework simultaneously displays at least one user-selectable icon operatively connected to an executable function of the electronic device and a voice command corresponding to each of the at least one user-selectable icon;

a multi-media framework which collects and records voice input and video input to generate first video data and first audio data before conversion into a voice recognition mode, and generates second video data and second audio data after conversion into the voice recognition mode; and a voice framework which:

analyzes the first video data and the first audio data to determine the start of speech, the first video data being a mouth shape;

when it is determined that results of both analyzing the first video data and analyzing the first audio data indicate that speech starts, converts a mode to a voice recognition mode;

when it is determined that the result of analyzing the first audio data indicates that the speech starts, attenuates a threshold of video analysis for determining whether the speech starts and re-determines whether the speech starts;

when it is determined that the result of analyzing the first video data indicates that the speech starts, attenuates a threshold of audio analysis for determining whether the speech starts and re-determines whether the speech starts;

when it is determined that the speech starts, requests voice command configuration to the user interface framework, and determines whether the speech is terminated based on the second video data and the second audio data.

12. The medium of claim 11, wherein the user interface framework removes display of the voice command when the voice framework determines that the speech is terminated.

13. The medium of claim 11, wherein the voice framework identifies a lip of a user from the first video data to determine whether the speech starts based on whether the lip is in an open position, and determines that the speech is terminated when a voice of the user is not included in the second audio data for at least a preset time.

14. The medium of claim 13, wherein the voice framework determines that the speech is terminated when a face of the user is not included in the second video data.

* * * * *